(12) United States Patent
Gleeson

(10) Patent No.: US 9,694,647 B1
(45) Date of Patent: Jul. 4, 2017

(54) HIGHLY INTEGRATED RELAY FOR HVAC SYSTEMS IN LARGE VEHICLES

(71) Applicant: Trans Air Manufacturing Corp., Dallastown, PA (US)

(72) Inventor: Edward J. Gleeson, Red Lion, PA (US)

(73) Assignee: TRANS/AIR MANUFACTURING CORP., Dallastown, PA (US)

( * ) Notice: Subject to any disclaimer, the term of this patent is extended or adjusted under 35 U.S.C. 154(b) by 0 days.

(21) Appl. No.: 15/077,321

(22) Filed: Mar. 22, 2016

(51) Int. Cl.
  *H02H 7/00* (2006.01)
  *B60H 1/00* (2006.01)
  *H02H 7/09* (2006.01)

(52) U.S. Cl.
  CPC ..... *B60H 1/00371* (2013.01); *B60H 1/00978* (2013.01); *H02H 7/09* (2013.01)

(58) Field of Classification Search
  CPC ............ B60H 1/322; B60H 2001/3266; B60H 2001/3275; B60H 1/00371; B60H 1/00978; H02H 7/09
  USPC .......... 361/22; 62/172, 133, 134, 323, 323.4
  See application file for complete search history.

(56) References Cited

U.S. PATENT DOCUMENTS

| | | | | |
|---|---|---|---|---|
| 4,622,831 A | * | 11/1986 | Grupa | B60H 1/00371 62/244 |
| 4,870,833 A | * | 10/1989 | Matsuda | B60H 1/00428 62/134 |
| 5,001,905 A | * | 3/1991 | Miyazaki | B60H 1/00371 454/161 |
| 5,428,967 A | * | 7/1995 | Goto | B60H 1/00978 323/901 |
| 5,609,037 A | * | 3/1997 | Fischler | B60H 1/3229 62/239 |
| 5,678,761 A | * | 10/1997 | Ikeda | B60H 1/00007 237/12.3 A |
| 5,749,235 A | * | 5/1998 | Ueda | B60H 1/00314 165/43 |
| 6,032,089 A | * | 2/2000 | Buckley | G06F 7/00 307/10.1 |
| 6,494,052 B1 | * | 12/2002 | Lee | B60H 1/00371 62/244 |
| 6,925,826 B2 | * | 8/2005 | Hille | B60H 1/00371 62/244 |
| 7,177,742 B2 | * | 2/2007 | Makishima | B60H 1/322 62/133 |
| 7,246,502 B2 | | 7/2007 | Hammonds et al. | |
| 7,475,559 B2 | * | 1/2009 | Gleeson | B60H 1/00585 307/10.1 |
| 9,180,891 B2 | * | 11/2015 | Van Polen | B61C 5/02 |
| 9,340,090 B2 | * | 5/2016 | Fukatsu | B60H 1/00392 |
| 2007/0281601 A1 | | 12/2007 | Hammonds | |

* cited by examiner

*Primary Examiner* — Rita Leykin
(74) *Attorney, Agent, or Firm* — Jacobson Holman, PLLC.

(57) ABSTRACT

A microprocessor controlled vehicle relay for high capacity HVAC systems in large high occupancy vehicles is provided that can be configured in different ways to provide a number of operational functions for improved safety as well as greater motor and/or compressor longevity.

20 Claims, 14 Drawing Sheets

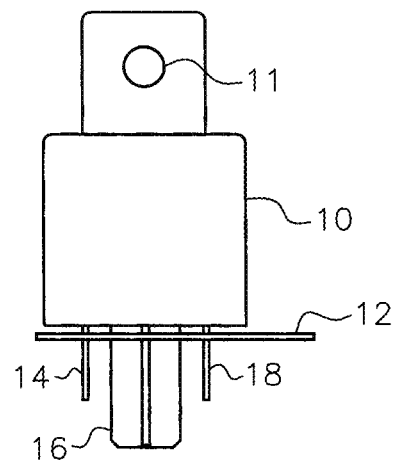
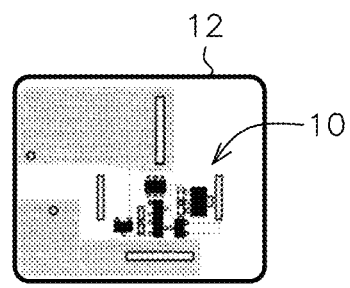
FIG. 1A
FIG. 1
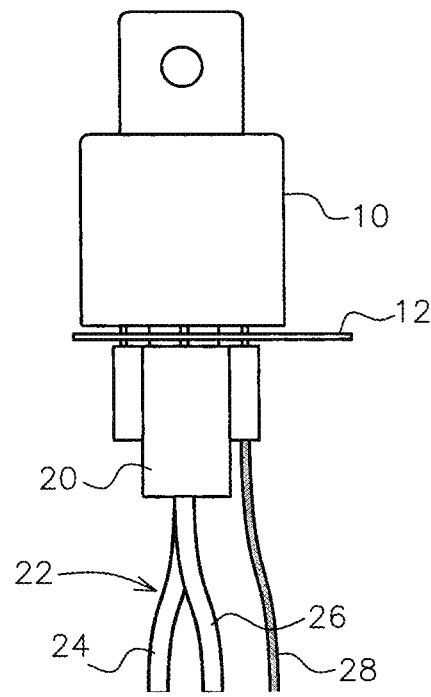
FIG. 2

HIGHLY INTEGRATED RELAY FOR HVAC SYSTEMS IN LARGE VEHICLES

BACKGROUND OF THE INVENTION

Field of the Invention

The present invention is related to the field of microprocessor controlled relays for motors and compressors, and more particularly, to a microprocessor controlled vehicle relay for HVAC systems installed in buses and other high occupancy vehicles that can be configured in different ways to provide a number of operational functions for improved safety as well as greater motor and/or compressor longevity.

Description of the Related Art

Climate control systems such as air conditioning systems in vehicles draw significant current upon initial start up. In large high occupancy vehicles such as buses which require heavy duty systems to provide the necessary cooling, the initial in-rush of current to the DC fan motor upon start-up of the air conditioning system can be on the order of 60 amps or more. This large inrush current could create a safety hazard under certain circumstances and also requires that the system include a large fuse able to withstand the surge in current. Should the motor fail, the high amount of current can create a dangerous condition and may overheat the fan motor to the point of catastrophic failure.

Accordingly, a need exists for a vehicle relay that reduces the inrush current to the DC fan motor upon climate control system start-up in buses and other high occupancy commercial vehicles to improve safety while also eliminating the need for large fuses and increasing motor longevity.

In addition, it would be advantageous to have a relay for a commercial high occupancy vehicle that is installed and able to protect against HVAC compressor overspeed, undervoltage to the compressor clutch in an HVAC system, and excessive cycling of the HVAC system compressor for extended motor life.

SUMMARY OF THE INVENTION

In view of the foregoing, the present invention is directed to an microprocessor controlled vehicle relay for high occupancy vehicles, such as commercial buses and the like, that have a large heavy duty HVAC or climate control system. The terms "climate control system" and "HVAC" are used interchangeably herein, with both referring to heating, ventilating and air conditioning systems installed, with respect to the present invention, in large vehicles. Large vehicles are those vehicles having a high occupancy capacity such as buses, whether commercial or private, including charter buses, airport shuttle buses and the like.

The vehicle relay includes a printed circuit board (PCB) having an input terminal, an output terminal, a plurality of transistors and a bypass relay circuit having an inductor and a switch. The bypass relay circuit is controlled by a microprocessor. The input terminal is connected to a power source and the output terminal supplies voltage to a fan motor or the like in a functional operating system such as the climate control system or the like. As used herein, the foregoing structural components are referred to as "the core vehicle relay components" or "the core components". The core vehicle relay components may be configured to include one or more additional components as will be described hereinafter according to the function that the relay is to perform.

According to a first embodiment of the present invention, the core vehicle relay components further include a negative temperature coefficient (NTC) resistor downstream of the input terminal. When the climate control system is off, the switch in the bypass relay is open. The microprocessor is programmed with an algorithm that controls a start up sequence for the fan motor that is connected to the output terminal of the PCB. Upon climate control system start-up, power is applied to the PCB input terminal. Because the switch in the bypass relay is open, current flows to the output terminal through the NTC resistor which reduces the amount of current that is able to initially rush into the fan motor. After a predetermined delay, the microprocessor energizes one or more transistors which energize the bypass relay circuit to close the switch. Once the switch is closed, the NTC resistor is bypassed by the bypass relay circuit and maximum operating voltage is then applied to the fan motor(s) of the HVAC system.

The core vehicle relay components according to the present invention may also be configured to perform other operational functions that reduce wear on the motor and/or compressor clutch of the climate control system. These functions include protection against compressor overspeed, undervoltage to the compressor clutch, and excessive cycling of the compressor.

Particularly, according to a second embodiment of the present invention, the vehicle relay is configured to prevent overspeed of the HVAC compressor due to overly high engine RPM. The core vehicle relay components are provided with a fourth terminal that is electrically connected to the microprocessor through a resistor. The output terminal is connected to the compressor clutch of the climate control system. While the climate control system is working, the switch in the bypass relay circuit is closed, allowing current to flow to the compressor and keep the clutch engaged. The fourth terminal provides an engine RPM input signal to the microprocessor. When the input signal received by the microprocessor indicates that the engine RPM has exceeded the compressor rating, the microprocessor de-energizes one or more transistors and the bypass relay circuit, opening the switch and interrupting current flow to disengage the clutch from the compressor. The high engine RPM is thus prevented from overloading and damaging the compressor. Once the engine RPM falls below the compressor rating, the microprocessor re-energizes the transistors and bypass relay circuit to close the switch and allow current to once again flow to and engage the clutch to activate the compressor.

According to a third embodiment of the present invention, the vehicle relay is configured to prevent undervoltage to the compressor clutch which can result in the clutch not being pulled in tightly and therefore slipping, causing unwanted wear. The core vehicle relay components are provided with an electrical connection between the input voltage and the microprocessor that runs through a resistor. Through this connection, the microprocessor monitors the input voltage going to the compressor clutch of the HVAC system to ensure the voltage is sufficient for proper clutch operation. If the voltage is detected as having fallen below a threshold value, the microprocessor de-energizes one or more transistors and the bypass relay circuit, opening the switch and interrupting current flow to the clutch to disengage the same. Once sufficient input voltage is restored, the microprocessor re-energizes the transistors and the bypass relay circuit to close the switch and allow current to once again flow to and engage the clutch for compressor operation.

According to a fourth embodiment of the present invention, the core components of the vehicle relay are configured to prevent excessive cycling of the HVAC system compressor which causes undue wear and reduces the life of the compressor. With the vehicle relay of the present invention in the anti-cycling configuration, the microprocessor is programmed with a timing function. With the climate control system off, the switch in the bypass relay circuit is open. When the climate control system is started, the microprocessor delays activation of one or more transistors and bypass relay for a predetermined interval, such as 20-30 seconds. By delaying closure of the switch and engagement of the compressor clutch, the number of times that the compressor is made to start up every minute is significantly reduced, extending compressor life.

Accordingly, it is an object of the present invention to provide a vehicle relay that reduces the initial surge of inrush current to the fan motor upon start up of a large capacity climate control system such as the HVAC systems installed on buses and the like, improving system safety and reducing the size requirements of fuses used in the system.

Another object of the present invention is to provide a vehicle relay in accordance with the preceding object that is easily installed and adaptable to virtually any vehicle HVAC system that could benefit from an initial reduction in current to a motor or compressor of the climate control system installed in the vehicle.

A further object of the present invention is to provide a vehicle relay in accordance with the preceding objects that, by reducing the initial current surge, reduces arcing and resulting wear on the motor brushes, increasing the longevity of the motor.

Yet another object of the present invention is to provide a vehicle relay that can be configured to prevent overspeed of the compressor in a climate control system due to overly high engine RPM.

A still object of the present invention is to provide a vehicle relay that can be configured to prevent undervoltage to the compressor clutch in a climate control system which can result in clutch slippage and unwanted wear.

Yet another object of the present invention is to provide a vehicle relay that can be configured to prevent excessive cycling of the compressor in a climate control system which causes undue wear and reduces the life of the compressor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 shows the vehicle relay according to the present invention.

FIG. 1A is an enlarged plan view of the printed circuit assembly of the relay shown in FIG. 1.

FIG. 2 shows the relay, printed circuit board, and connector of FIG. 1 as assembled.

DETAILED DESCRIPTION OF THE PREFERRED EMBODIMENTS

Figure 3:
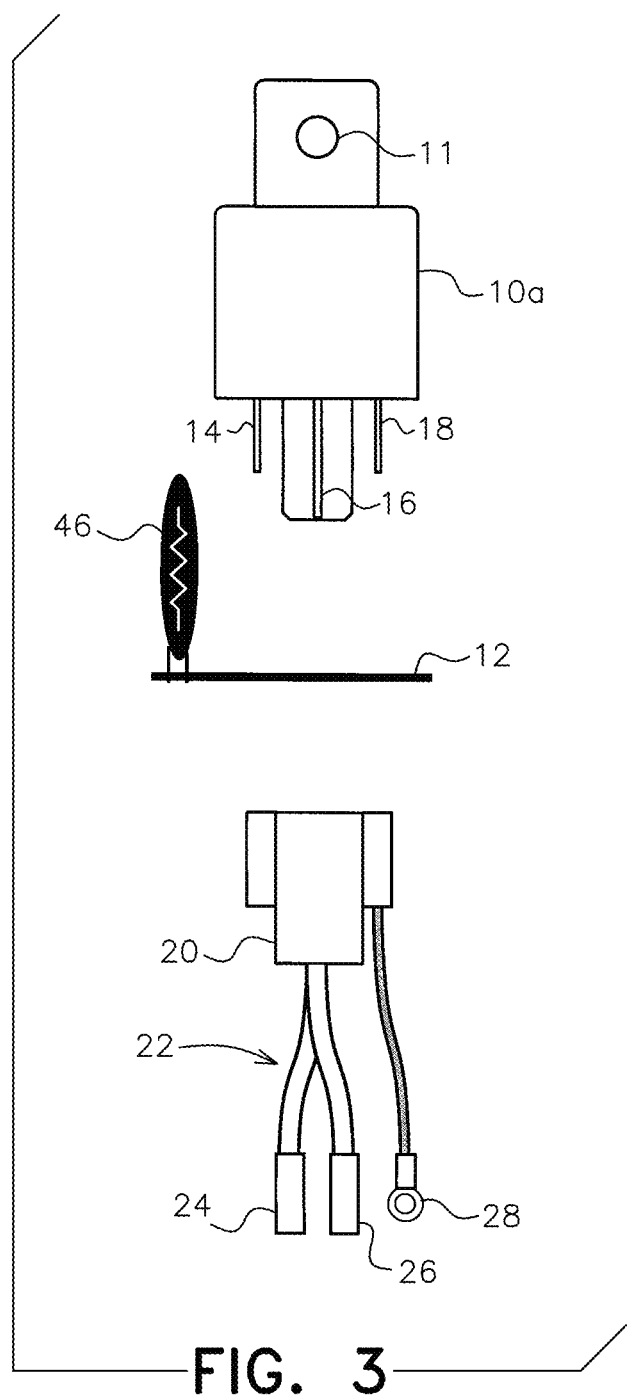
FIG. 3 shows an exploded view of the components shown in FIG. 2 according to a first embodiment of the present invention in which the relay is configured for provision of a "soft start" of the fan motor(s) of a vehicle climate control system upon activation thereof.

While several preferred embodiments of the invention are disclosed herein, it is to be understood that these embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIGS. 1-2, the present invention is directed to a relay generally designated by reference numeral 10. The relay has at least four embodiments including a "soft start" relay 10a, an overspeed protection relay 10b, an undervoltage protection relay 10c and an over-cycling prevention relay 10d.

The relay 10 includes a printed circuit board (PCB) assembly 12. The PCB assembly 12 has electrical relay terminals including a first relay terminal 14, a second relay terminal 16, and a third relay terminal 18. The relay is configured to connect with a connector 20 having a wiring harness, generally designated by reference numeral 22, and splice terminals including a first splice terminal 24, a second splice terminal 26 and a third splice terminal 28. When the connector and the relay are assembled as shown in FIG. 2, the first relay terminal 14 is electrically connected with the first splice terminal 24, the second relay terminal 16 is electrically connected with the second splice terminal 26, and the third relay terminal 18 is electrically connected with the third splice terminal 28. The relay may also have a mounting hole 11.

When the relay 10 and connector 20 are coupled to one another for use, either the first splice terminal 24 or the second splice terminal 26 may be connected to a power source such as a 12V battery 30. If the first splice terminal 24 is connected to the power source, the printed circuit board is powered through the first relay terminal 14. Conversely, if the second splice terminal 26 is connected to the power source, the printed circuit board is powered through the second relay terminal 16. The third relay terminal 18 and the third splice terminal 28 are connected to ground 32 (see FIGS. 4, 6, 8 and 9).

The printed circuit board assembly 12 of the relay 10 may be configured in different ways according to the function that it is to perform. As described herein, there are at least four different embodiments of the relay including a "soft start" relay 10a, an overspeed protection relay 10b, an undervoltage protection relay 10c and an over-cycling prevention relay 10d. As described herein, use of "relay 10" is intended to include all four embodiments, while use of the specific reference numerals 10a-10d indicates the corresponding specific embodiment that is in view.

In all four embodiments described herein, the vehicle relay 10 includes a common set of components comprising the core components of the relay 10. These core components include a microprocessor (U1) 40, a voltage regulator (U2) 42, transistors (Q1, Q2) 44, a plurality of diodes (D1, D2, D3) 48a, 48b, 48c, and a bypass relay circuit X1 relay generally designated by reference numeral 50. The bypass relay circuit X1 50 includes a switch 52 and a relay coil 54. The core components are mounted in the PCB 12.

The voltage regulator 42 provides a constant voltage level to the microprocessor 40 and the transistors 44 isolate the unregulated voltage from the microprocessor. When the relay 50 has been energized and then subsequently de-energized, the D3 diode 48c clamps the inductive energy created by the relay inductance 54 in the X1 relay 50 to prevent a voltage spike. In all of the embodiments shown herein, the power source is a 12V battery 30 although other power sources could be used.

As noted above, the core vehicle relay components may be configured with one or more additional components as will be described hereinafter according to the function that the relay is to perform.

Figure 4:
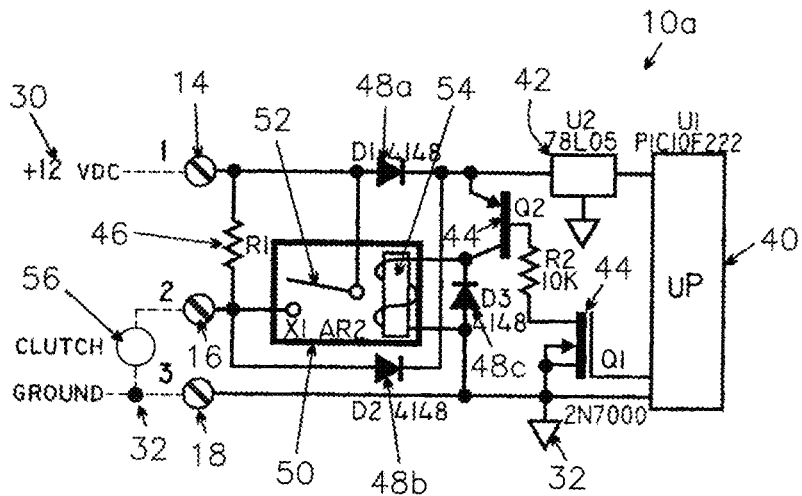
FIG. 4 is a schematic of the printed circuit board shown in FIG. 3.

In the first embodiment shown in FIGS. 3 and 4, referred to herein as the "soft start" configuration, the printed circuit assembly 12 of the relay 10a is configured to provide a ramped start-up voltage, or "soft start", for a motor, compressor or the like, shown in FIG. 4 as a fan motor 56. In addition to the core components of the U1 microprocessor 40, the U2 voltage regulator 42, the Q1 and Q2 transistors 44, the plurality of diodes 48a, 48b, 48c, and the X1 bypass relay circuit 50, the vehicle relay 10a is provided with a negative temperature coefficient (NTC) R1 resistor 46 downstream of the input terminal. The microprocessor 40 is programmed with an algorithm that controls the "soft start" start-up sequence for the fan motor 56.

In the embodiments shown schematically in FIGS. 4, 6, 8 and 9, the relay 10 is powered through the first relay terminal 14 with voltage generated by the relay 10a being applied to the load, such as fan 56 or compressor 57 through compressor clutch 55, through the second relay terminal 16. However, by including the D2 diode 48b as well as the D1 diode 48a, the heavy gauge wiring polarity can be reversed because the microprocessor can be powered through either the first relay terminal or the second relay terminal, with voltage being applied to the compressor clutch or fan through the other of the two terminals, i.e., the terminal not connected to the power source. This ability to power the relay through either the first or the second relay terminal makes installation easier since the installer cannot "go wrong" regardless of which terminal he or she connects to the power source.

Figure 4A:
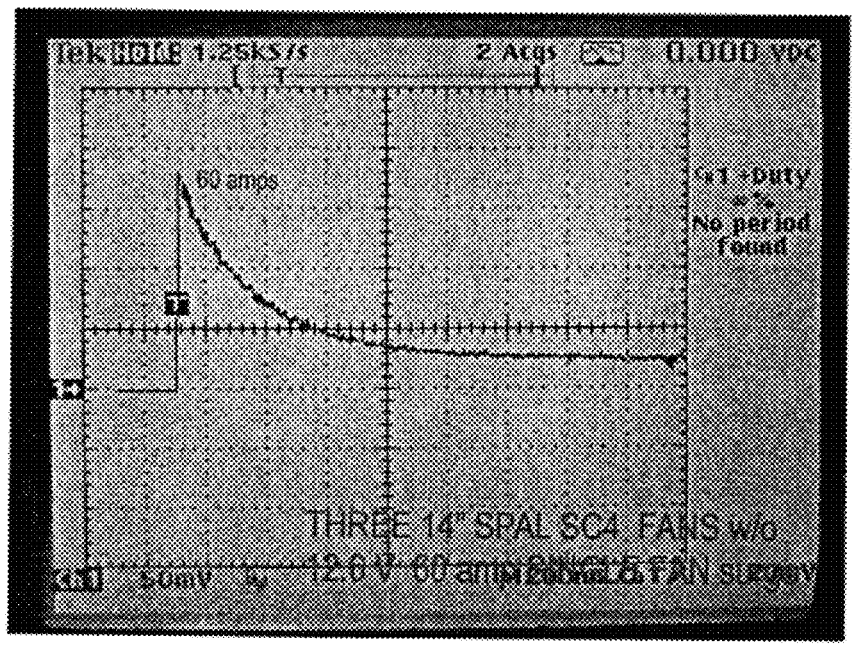
FIG. 4A is a graph of the typical inrush current to fan motor(s) upon start-up of a conventionally configured vehicle climate control system.
Figure 4B:
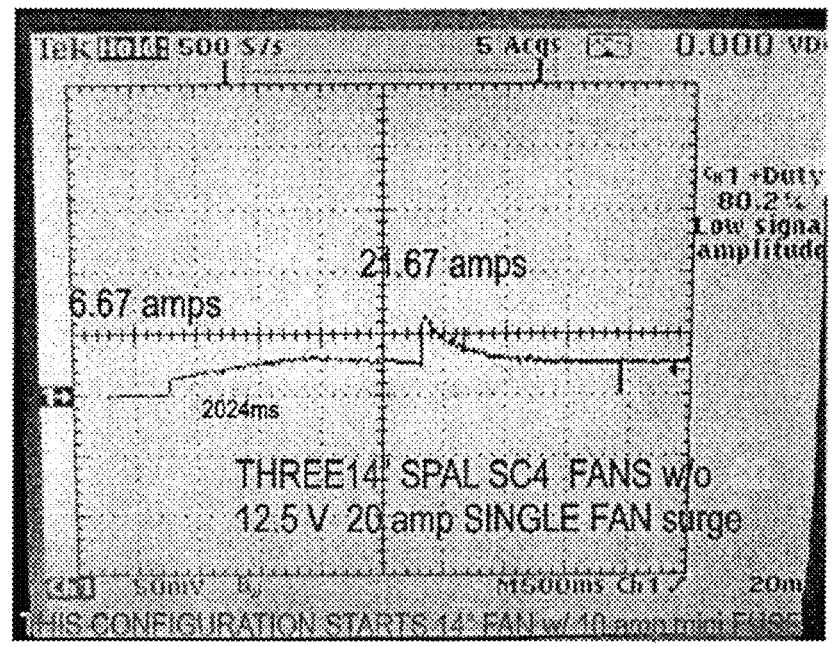
FIG. 4B is a graph of the greatly reduced initial current to the fan motor(s) upon start-up of the vehicle climate control system when the "soft start" relay has been inserted into the system wiring according to the present invention.
Figure 10A:
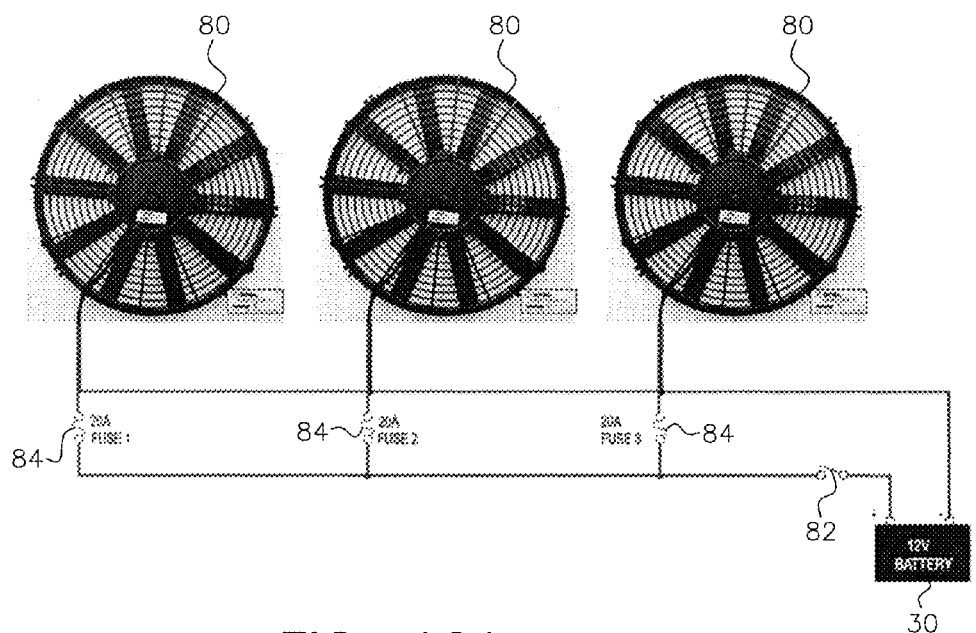
FIG. 10A shows a prior art vehicle wiring arrangement between three fans of a climate control system and a power source.
Figure 10B:
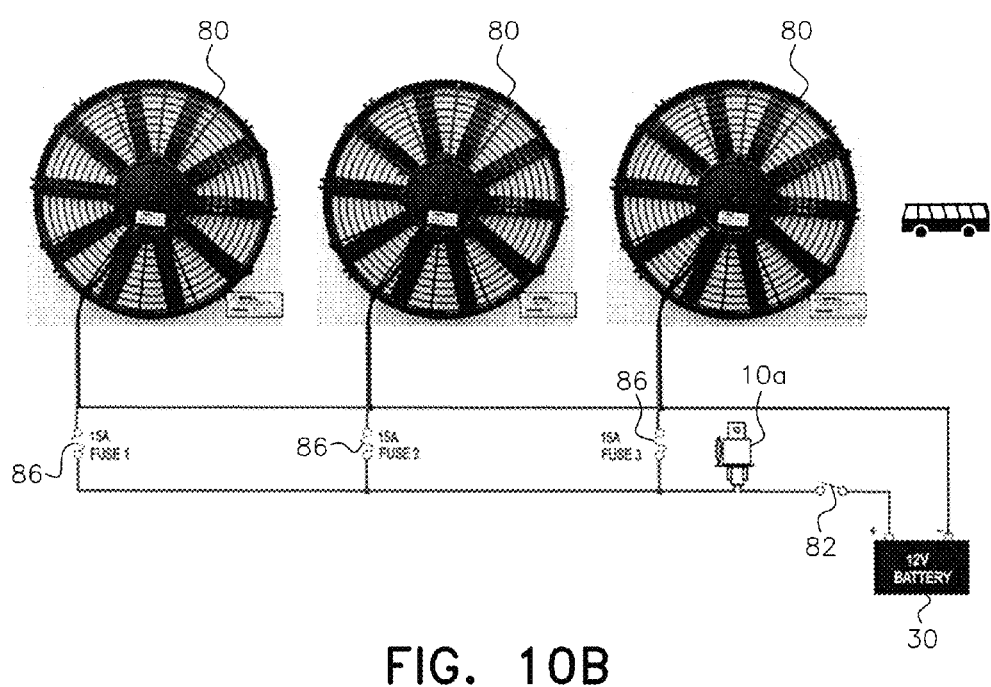
FIG. 10B shows the components of FIG. 10A with the vehicle relay inserted into the existing vehicle wiring in the "soft start" configuration according to the first embodiment of the present invention.

According to the first embodiment shown in FIGS. 3, 4 and 10B, when the climate control system 300 (see FIGS. 11A-11C) of the vehicle (not shown) is off, the switch 52 in the X1 bypass relay 50 of relay 10a is open. Upon climate control system start-up, power is applied to the input terminal 14. With the switch 52 in the bypass relay 50 being open, current flows to the output terminal of the relay 10a through the NTC resistor 46, with the NTC resistor 46 acting to reduce the amount of current that is able to initially rush into the fan motor(s) 56 (see also three fan motors 80 in FIG. 10B). After a predetermined time delay programmed into the microprocessor, the microprocessor energizes the transistors 44 which, in turn, energize the bypass relay circuit 50 to close the switch 52. Once the switch is closed, the NTC resistor 46 is bypassed by the relay circuit 50 and maximum operating voltage is applied to the fan motor by the relay 10a. With the "soft start" sequence, reduction in the initial inrush of current to the fan motor has been realized from on the order of 60 amps as occurs without the vehicle relay, shown graphically in FIG. 4A, to on the order of 6.7 amps, shown graphically in FIG. 4B. This current reduction allows the 25 amp fuse used in the FIG. 4A scenario to be reduced in size to a 10 amp fuse as used with the "soft start" as shown in FIG. 4B, and also provides for longer motor life.

Figure 6:
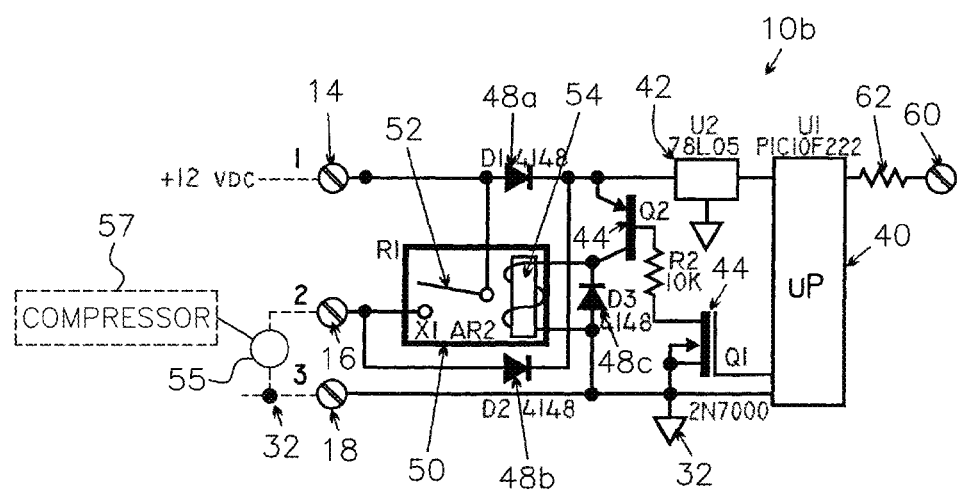
FIG. 6 is a schematic of the printed circuit board shown in FIG. 5.
Figure 5:
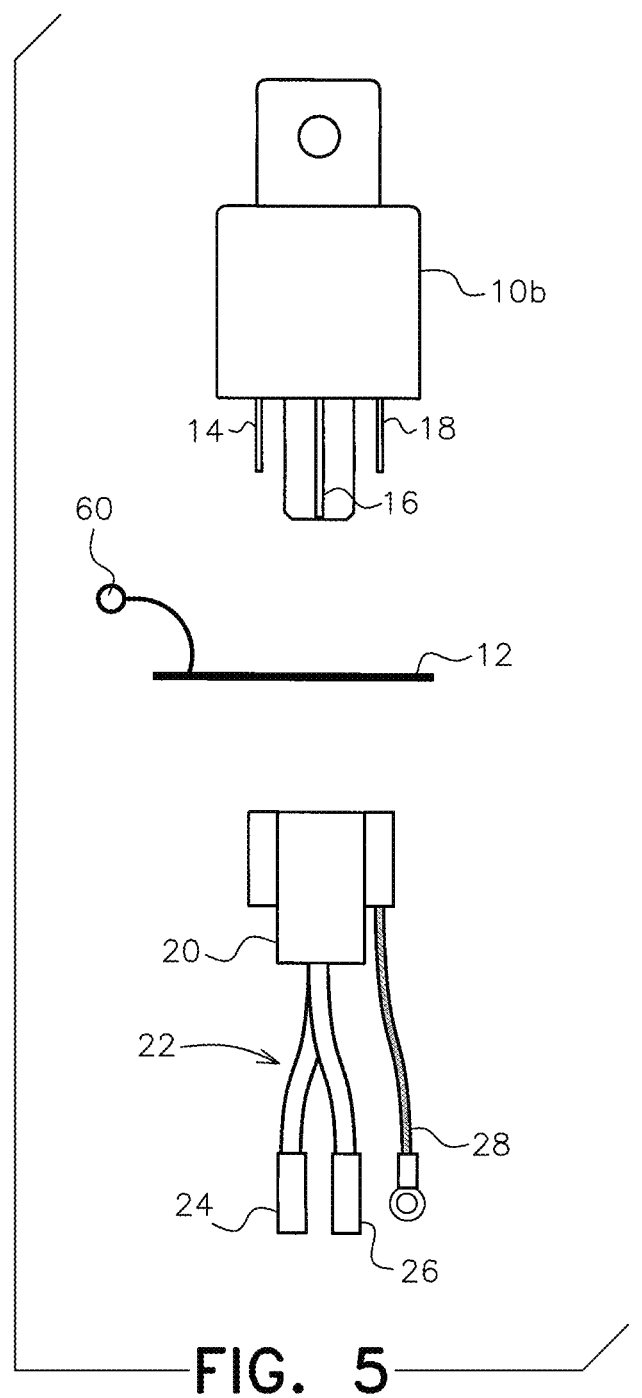
FIG. 5 shows an exploded view of the components shown in FIG. 2 according to a second embodiment of the present invention in which the relay is configured for overspeed prevention.
Figure 11A:
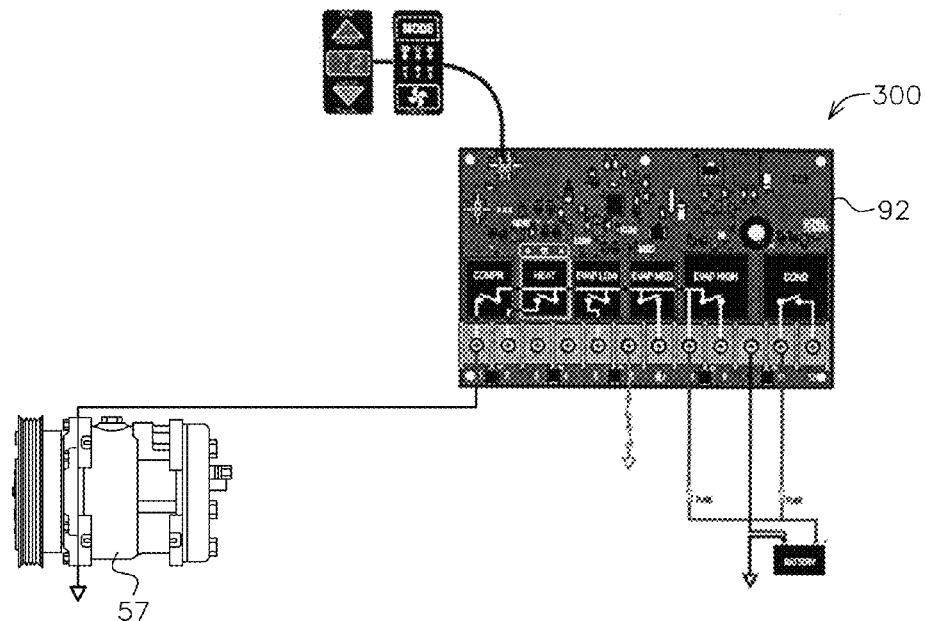
FIG. 11A shows a prior art vehicle wiring arrangement between a compressor and control panel of a climate control system.
Figure 11B:
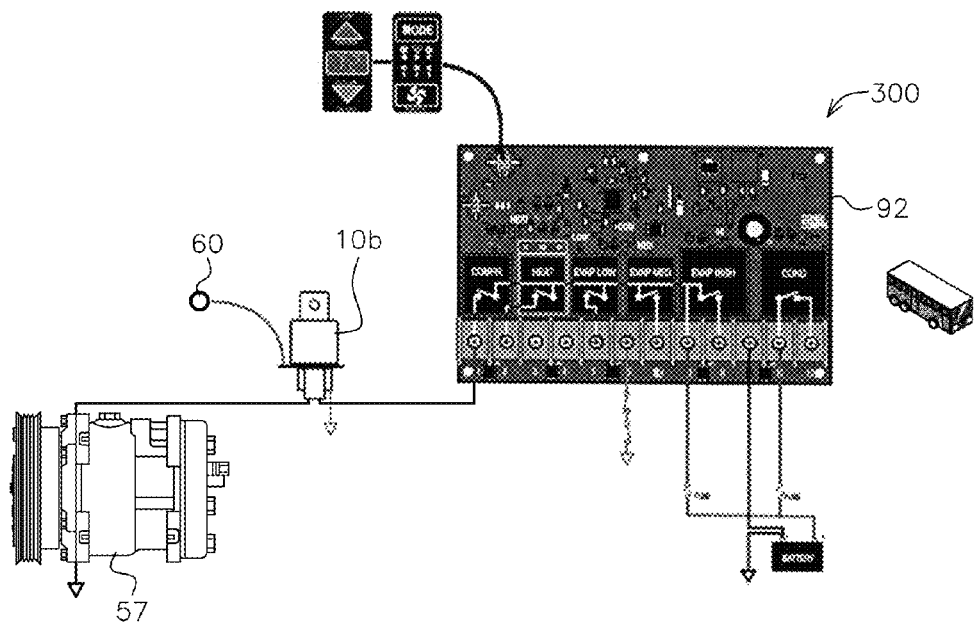
FIG. 11B shows the components of FIG. 11A with the vehicle relay inserted into the existing vehicle wiring in the overspeed protection configuration according to the second embodiment of the present invention.

The second embodiment of the present invention, in which the vehicle relay 10b is configured to protect the compressor 57 from operating above the manufacturer's recommended RPM, is shown in FIGS. 5, 6 and 11B. Overspeed of the compressor 57 can occur when overly high engine RPM is applied to the compressor through the compressor clutch 55. Excessive engine RPM can be a problem with large after-market-manufactured vehicles such as airport shuttle buses which are often built with larger engines which can overdrive the compressor. Overspeed can also occur when the vehicle is accelerated, as in a passing situation. With the overspeed protection function of the second embodiment of the present invention, the compressor clutch is disengaged in response to this rapid acceleration which not only protects the compressor but, by removing the load of the compressor on the engine, gives the vehicle engine more power and speed to complete the passing maneuver.

According to the second embodiment of the relay 10*b* shown schematically in FIG. 6, a fourth terminal 60 is added to the core vehicle relay components. The fourth terminal 60 is electrically connected to the microprocessor through a resistor (R3) 62. The output terminal of the vehicle relay 10*b* is connected to the compressor clutch of the climate control system and the switch in the bypass relay circuit is normally closed, allowing current to flow to the compressor clutch 55 to start the compressor 57. The microprocessor 40 monitors the engine RPM signal received through the fourth terminal 60 and, in the event that the signal indicates that the engine RPM has exceeded the compressor rating, the microprocessor 40 de-energizes the transistors 44 and the bypass relay circuit 50 which opens the switch 52 and interrupts current flow to disengage the clutch. The high engine RPM is thus prevented from overloading and damaging the compressor 57. When the microprocessor detects that the engine RPM has fallen back below the rating of the compressor, the microprocessor re-energizes the transistors and the bypass relay circuit to close the switch and allow current to once again flow to engage the compressor clutch and activate the compressor.

Figure 7:
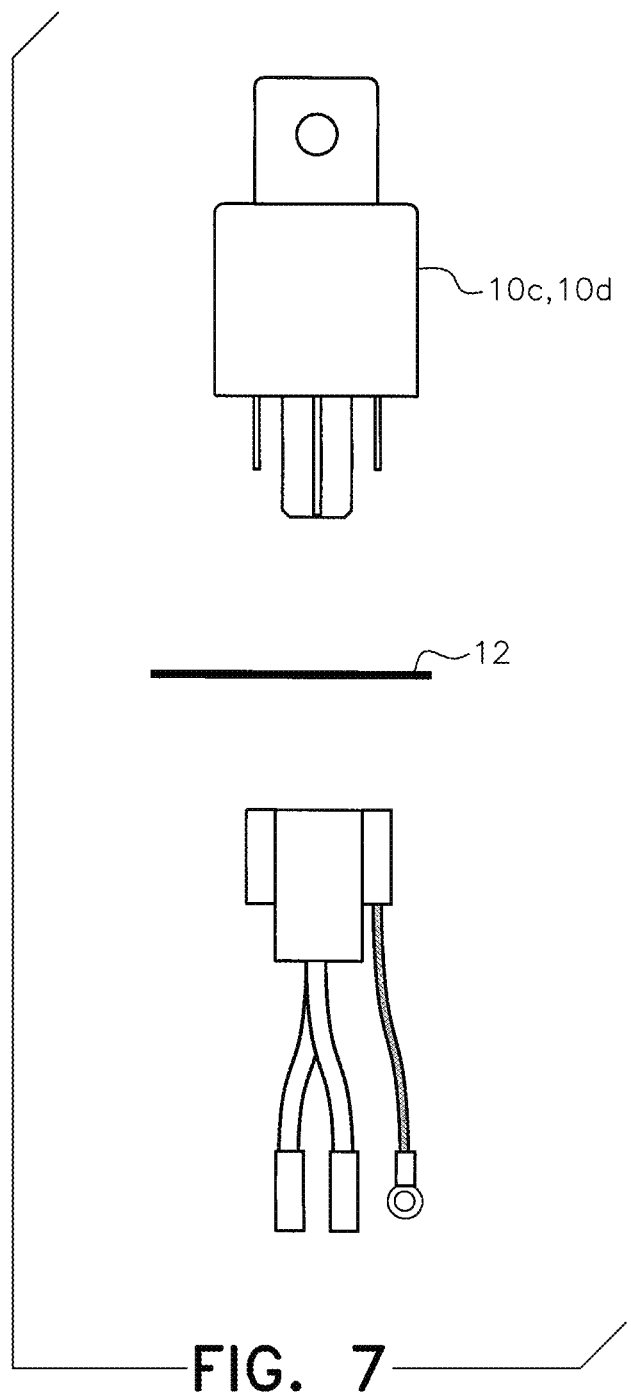
FIG. 7 shows an exploded view of the components shown in FIG. 2 according to either a third embodiment in which the relay is configured to prevent undervoltage to the compressor clutch or a fourth embodiment in which the relay is configured to prevent over-cycling of the compressor in accordance with the present invention.
Figure 8:
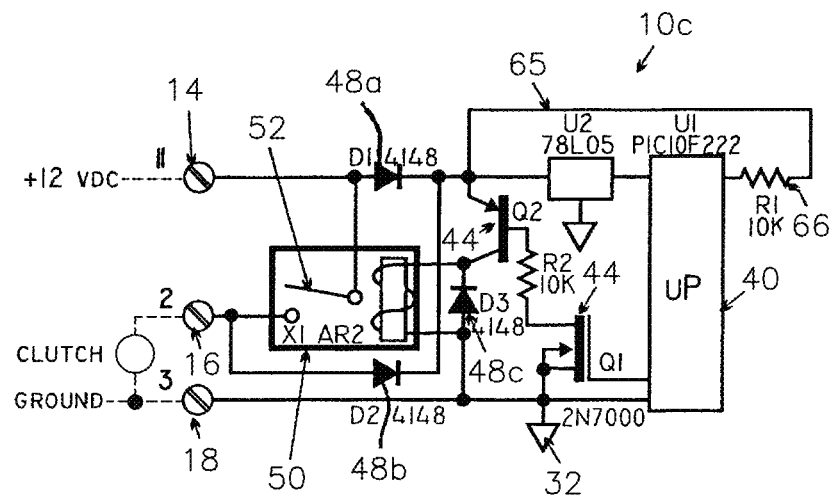
FIG. 8 is a schematic of the printed circuit board shown in FIG. 7 according to the third embodiment when the relay is configured for undervoltage protection prevention.
Figure 11C:
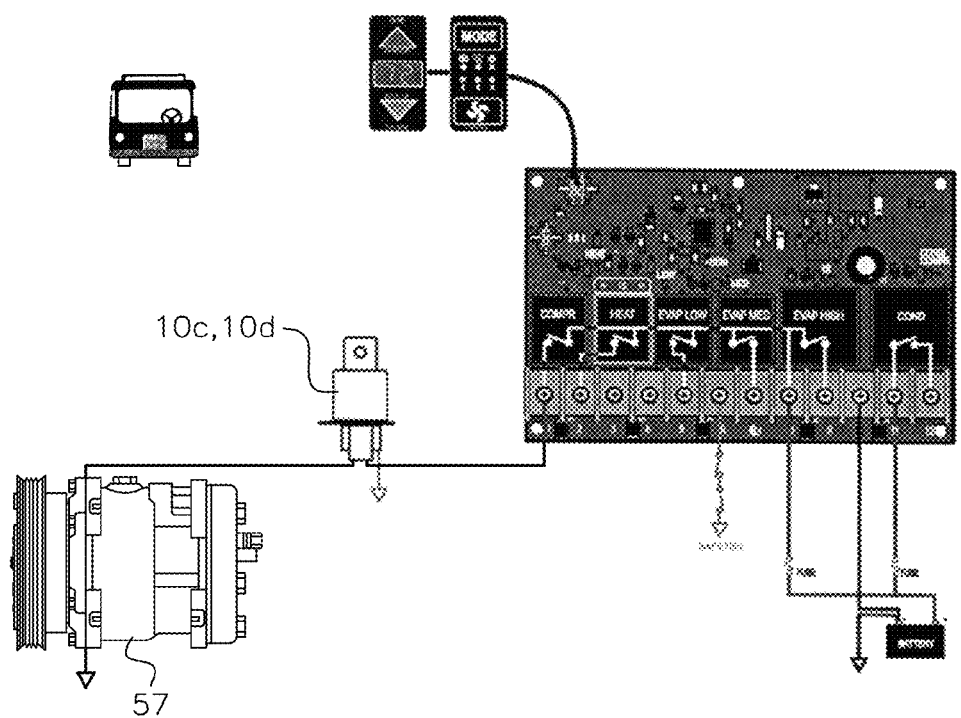
FIG. 11C shows the components of FIG. 11A with the vehicle relay inserted into the existing vehicle wiring for use in either the undervoltage protection configuration or the over-cycling prevention configuration according to the third and fourth embodiments of the present invention, respectively.

The third embodiment of the present invention, in which the vehicle relay 10*c* is configured to prevent undervoltage to the compressor clutch, is shown in FIGS. 7, 8 and 11C. When voltage to the compressor clutch 55 is too low, the clutch is not pulled in tightly enough and therefore slips, causing unwanted wear. Typical causes of inadequate voltage include installation of electrical systems in the vehicle without heavy enough wire, or the addition of extra accessories, such as a wheelchair power lift, to a stock vehicle, such that there is insufficient voltage to power all of the vehicle systems, particularly when the vehicle engine is idling, such as at a stop light.

In the third embodiment as shown schematically in FIG. 8, the core vehicle relay components are further provided with an electrical connection 65 between the input voltage on terminal 14 and the microprocessor 40 that runs through a resistor (R1) 66 to prevent possible damage to the microprocessor. Through this connection 65, the relay microprocessor monitors the input voltage going to the clutch 55 to ensure that the voltage is sufficient for proper clutch operation. If the voltage is detected as having fallen below a threshold value, the microprocessor de-energizes the transistors and the bypass relay circuit which opens the switch and interrupts current flow to the clutch for disengagement thereof. Once the microprocessor detects that sufficient input voltage has been restored, the microprocessor re-energizes the transistors and the bypass relay circuit to close the switch and allow current to once again flow to and re-engage the clutch. By disengaging the clutch when the voltage is too low for proper clutch operation, needless wear on the clutch is prevented, extending the life thereof.

Figure 9:
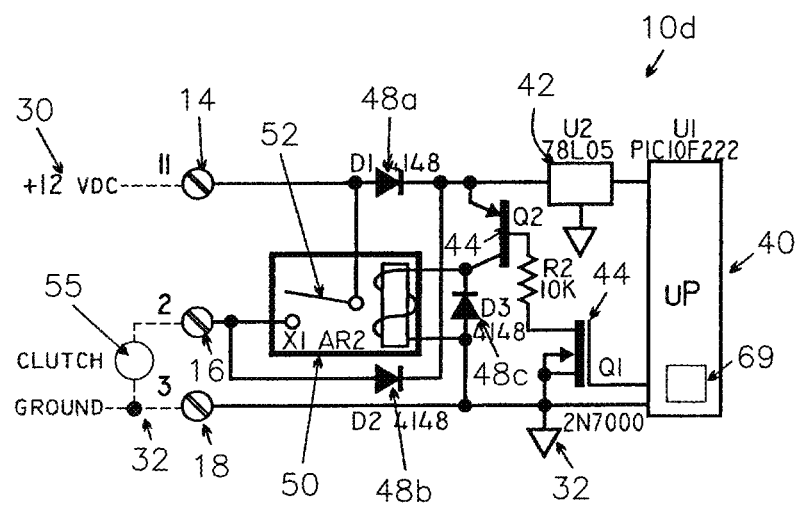
FIG. 9 is a schematic of the printed circuit board shown in FIG. 7 according to the fourth embodiment when the relay is configured for over-cycling prevention.

The fourth embodiment of the present invention, in which the vehicle relay 10*d* is configured to prevent excessive or over-cycling of the compressor, is shown in FIGS. 7, 9 and 11C. FIGS. 7 and 11C are common to both the third and fourth configurations because the relay is shown therein only as a component without illustrating the specific layout of the PCB which is where the differences between the third and fourth embodiments are configured.

Excessive cycling of the compressor can result due to low ambient temperature, low refrigerant charge and/or improper system design. For example, commercial buses are often provided with a large climate control system compressor. Large compressors are able to lower the temperature in the bus within a few seconds, after which they turn off. In a very short time, however, the temperature rises above the desired setting and must again be lowered, causing the compressor to start back up. As a result, the compressor may start and stop an excessive number of times every minute which shortens the life of the compressor.

With the vehicle relay 10*d* in the over-cycling prevention configuration according to the fourth embodiment shown schematically in FIG. 9, the microprocessor has a timing function 69. With the climate control system off, the switch in the relay is open. When the climate control system is started, it sends a start-up signal to the compressor via the microprocessor. The microprocessor, however, in response to the timing function 69, waits for a predetermined interval before energizing the transistors and the relay circuit 50 to close the switch and allow current to flow to the compressor. The delay time interval is programmed into the microprocessor and is preferably on the order of about 20-30 seconds. This time delay before the relay is energized to activate the compressor significantly reduces the number of times that the compressor is made to start up every minute, extending compressor life.

The vehicle relay as described herein can be easily inserted into existing vehicle wiring such as that shown in FIG. 10A. As shown, the wiring between the battery 30 and the three fans 80 includes a condenser control relay 82 and a 20 amp fuse 84 for each of the fans 80. In the case of the "soft start" configuration, the relay 10*a* is inserted between the battery 30 and the fan motors 80 as shown in FIG. 10B to control the initial rush of current to the fan motors. With the "soft start" relay 10*a*, smaller fuses can be used, shown in FIG. 10B as 15 amp fuses 86. The fan motors 80 are represented in the schematic of FIG. 4 by fan 55.

The vehicle relay as described herein can also be easily inserted into existing vehicle wiring such as that shown in FIG. 11A. In the overspeed protection configuration shown in FIG. 11B, the relay 10*b* is inserted between the refrigeration compressor 57 and the PCB 92 of a climate control system 300. Similarly, in either the over-cycling prevention configuration or the undervoltage protection configuration shown in FIG. 11C, the relay 10*c* or 10*d*, respectively, is inserted between the refrigeration compressor 57 and the climate control system PCB 92.

Figure 12:
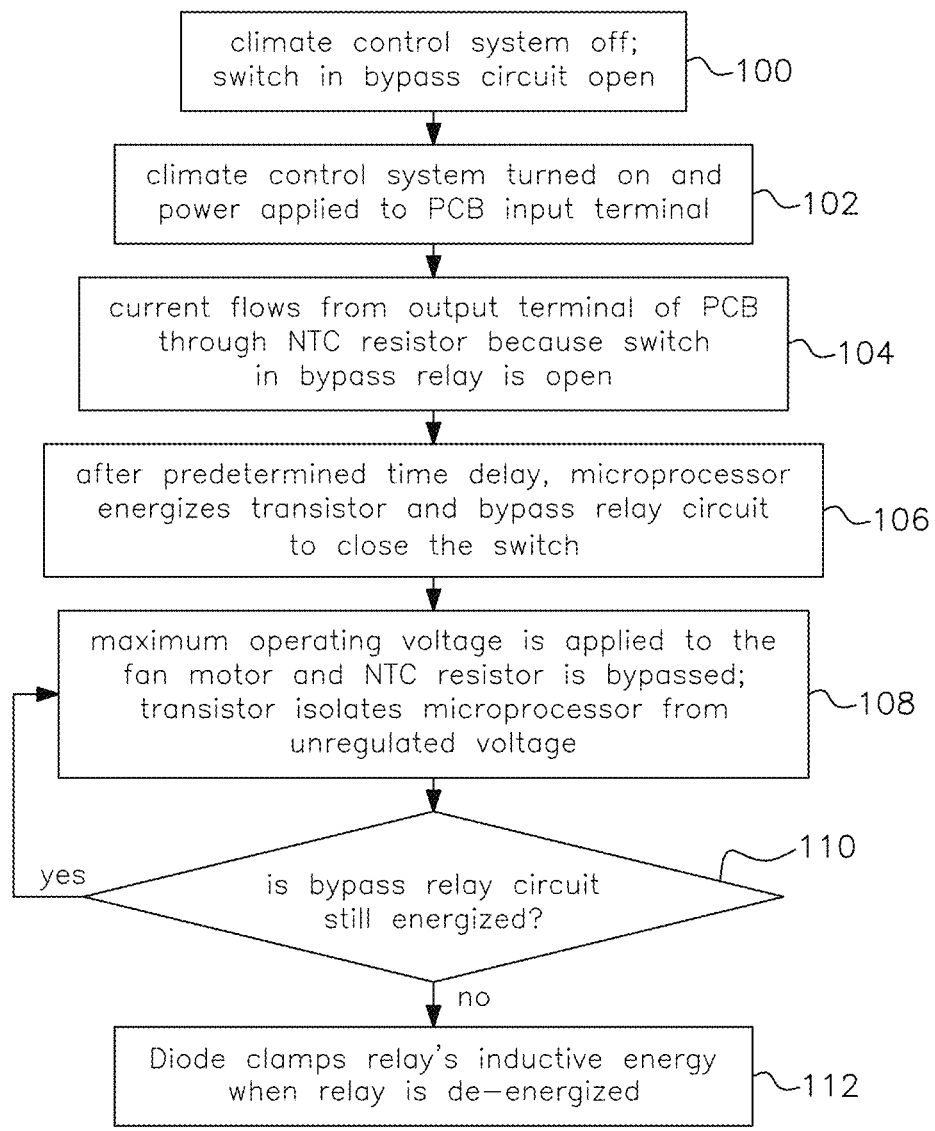
FIG. 12 is a flowchart of the vehicle relay operating in the "soft start" configuration according to the first embodiment of the present invention.

A method of operation of the vehicle relay 10*a* in the first "soft start" configuration is summarized in the flowchart of FIG. 12. Initially, the climate control system is off and the switch in the bypass relay is open, step 100. When the climate control system is started, power is applied to the input terminal of the PCB, step 102. Current flows to the output terminal through the NTC resistor, step 104, which reduces the initial inrush of current to the fan motor. After a predetermined time delay, the microprocessor energizes the transistors and the bypass relay circuit to close the switch 52, step 106. Once the switch is closed, the NTC resistor is bypassed by the relay circuit 50 and maximum operating voltage is applied to the fan motor while the transistors isolate the microprocessor from unregulated voltage, step 108. As long as the relay circuit remains energized, step 110, maximum operating voltage continues to be applied to the fan motor and the NTC resistor is bypassed, step 108. If the relay circuit is de-energized, step 110, a diode downstream of the transistors clamps the relay's inductive energy, step 112, allowing for gradual dissipation of the inductive energy and preventing a voltage spike.

Figure 13:
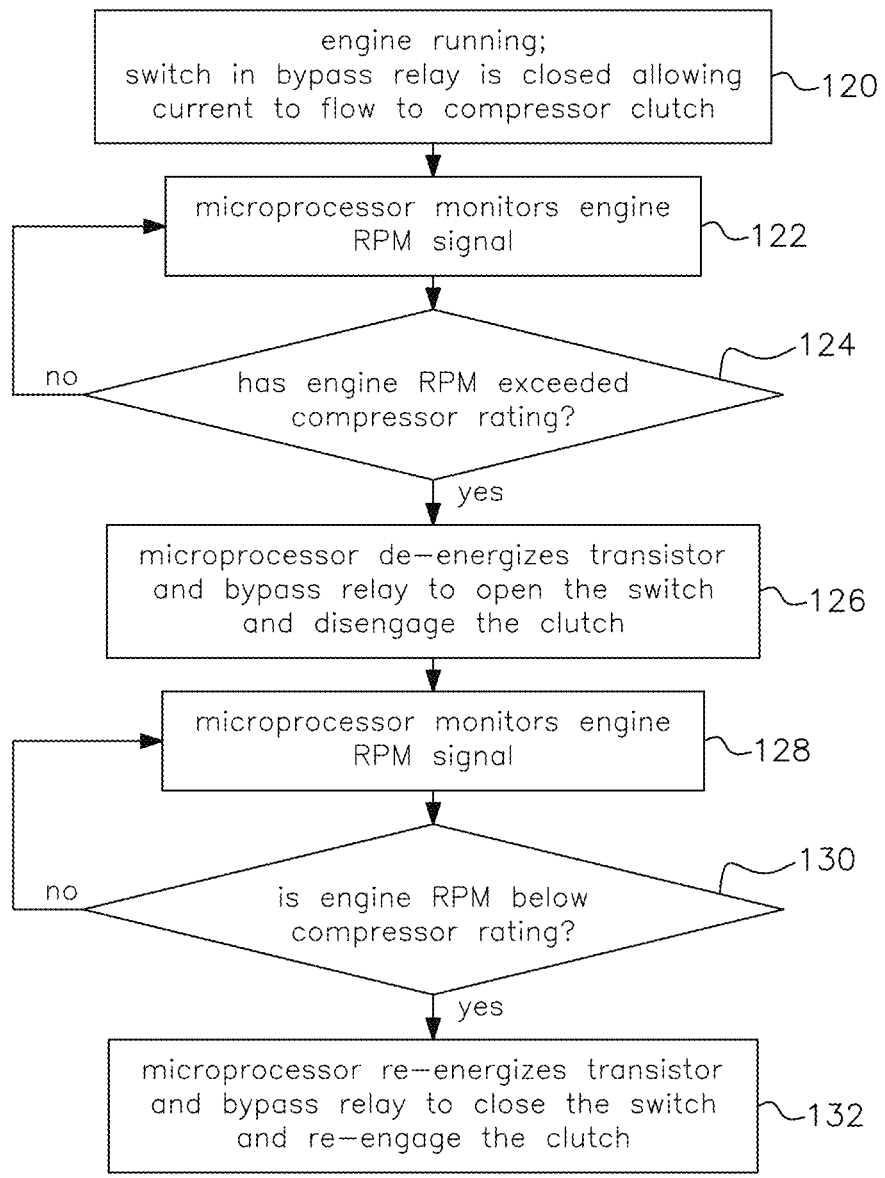
FIG. 13 is a flowchart of the vehicle relay operating in the overspeed prevention configuration according to the second embodiment of the present invention.

A method of operation of the vehicle relay 10b in the second overspeed prevention configuration is summarized in the flowchart of FIG. 13. Initially, the engine is running and the switch in the bypass relay circuit is closed, step 120, allowing current to flow from the output terminal of the relay to the compressor clutch. The microprocessor monitors the engine RPM signal, step 122, with the RPM signal being received through a fourth terminal that is electrically connected to the microprocessor through a resistor. In the event that the signal indicates that the engine RPM has exceeded the clutch compressor rating, step 124, the microprocessor de-energizes the transistors and the bypass relay circuit which opens the switch 52 and interrupts current flow to the clutch resulting in disengagement thereof, step 126. The microprocessor continues to monitor engine RPM, step 128. When the microprocessor detects that the engine RPM has fallen back below the rating of the compressor, step 130, the microprocessor re-energizes the transistors and the bypass relay circuit, step 132, to close the switch and allow current to once again flow to the compressor clutch for re-engagement thereof.

Figure 14:
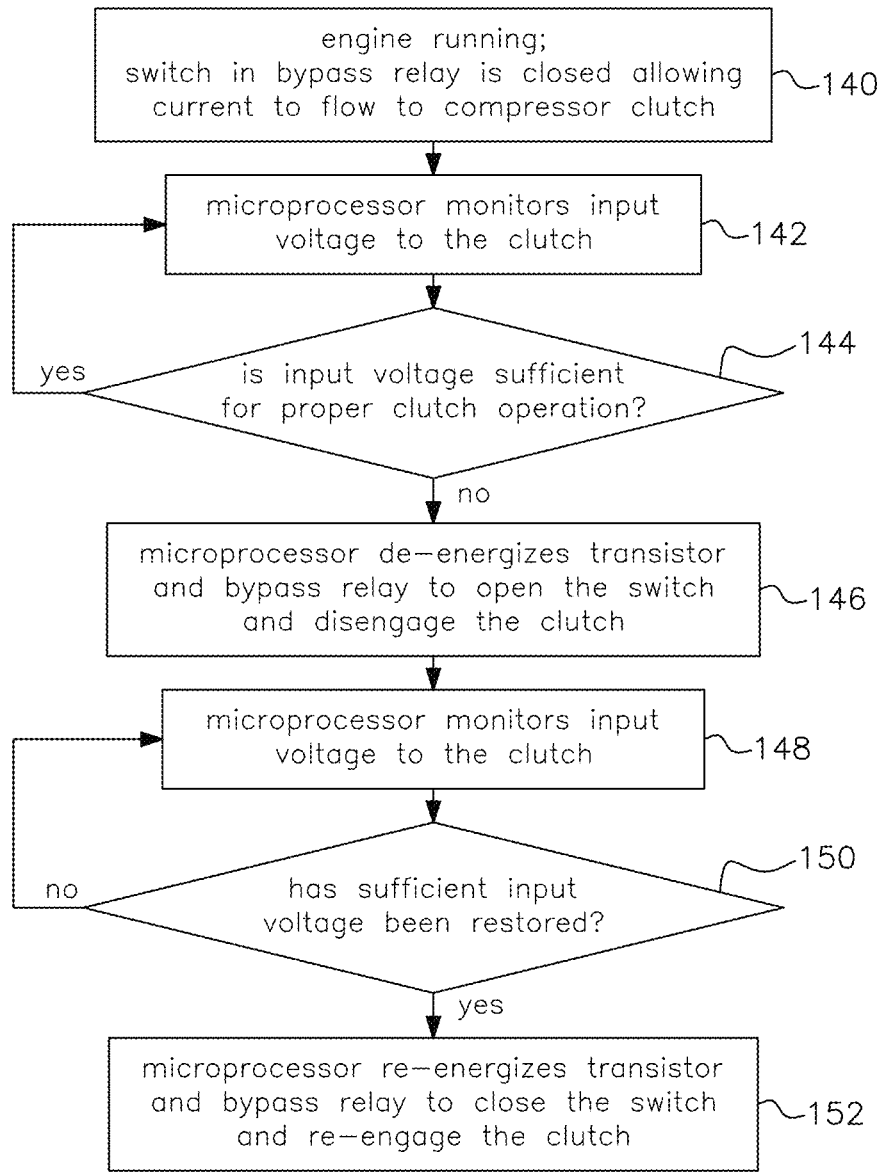
FIG. 14 is a flowchart of the vehicle relay operating in the undervoltage protection configuration according to the third embodiment of the present invention.

A method of operation of the vehicle relay 10c in the third undervoltage protection configuration is summarized in the flowchart of FIG. 14. Initially the engine is running and the switch in the bypass relay circuit is closed, allowing current to flow from the output terminal of the relay to the compressor clutch, step 140. The microprocessor monitors the input voltage going to the clutch, step 142, through an electrical connection between the input voltage and the microprocessor that runs through a resistor. In the event that the microprocessor detects that the input voltage going to the clutch is insufficient for proper clutch operation, step 144, the microprocessor de-energizes the transistors and the bypass relay circuit which opens the switch and interrupts current flow to disengage the clutch, step 146. The microprocessor continues to monitor the input voltage to the clutch, step 148. Once the microprocessor detects that sufficient input voltage has been restored, step 150, the microprocessor re-energizes the transistors and the bypass relay circuit to close the switch and re-engage the clutch, step 152.

Figure 15:
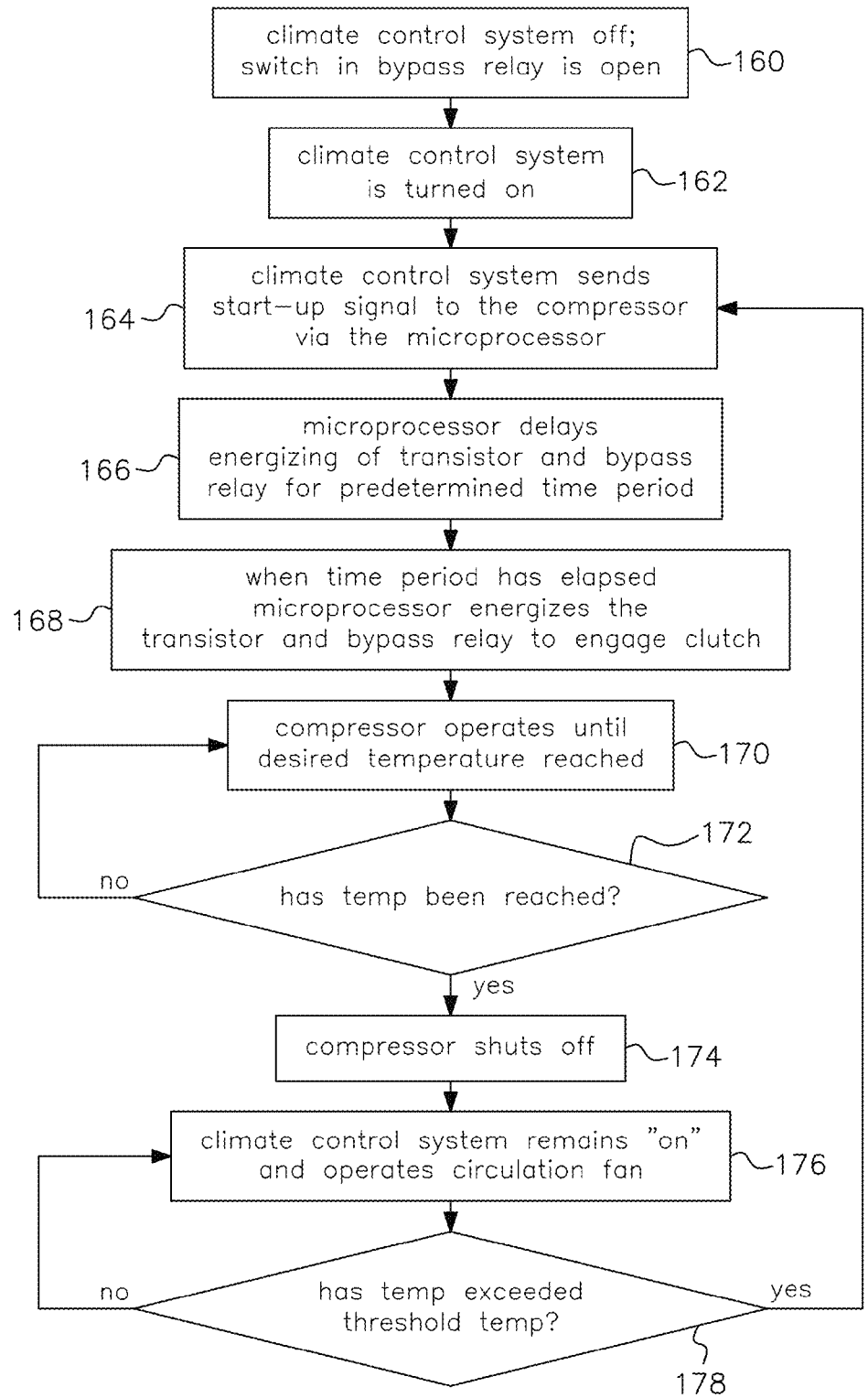
FIG. 15 is a flowchart of the vehicle relay operating in the anti-cycling configuration according to the fourth embodiment of the present invention.

A method of operation of the vehicle relay 10d in the fourth over-cycling prevention configuration is summarized in the flowchart of FIG. 15. Initially, the climate control system is turned off and the switch 52 in the X1 bypass relay 50 is open, step 160. When the climate control system is started, step 162, a signal is sent to activate the compressor, step 164. The signal goes through the relay 10d where the microprocessor delays energizing the transistors and the relay circuit for a predetermined interval, step 166. At the conclusion of the time delay interval, the microprocessor energizes the transistors and the bypass relay circuit to close the switch and allow current to flow to and start the compressor, step 168. The compressor operates, step 170, until the desired temperature has been reached. Once the temperature has been reached, step 172, the compressor shuts down, step 174, while the climate control system continues to operate a circulation fan providing cool air into the vehicle, step 176. When the temperature in the vehicle rises above a predetermined threshold, step 178, steps 164-178 are cyclically repeated for as long as the climate control system is turned on in the vehicle.

The present invention is also directed to the combination of a large high occupancy vehicle, a vehicle relay 10 and a climate control system in the high occupancy vehicle having at least one fan motor electrically connected to an output terminal of the relay 10, representatively shown in FIG. 10B, as well as to the combination of a vehicle relay and a vehicle climate control system having a refrigeration compressor and a compressor clutch, representatively shown in FIGS. 11B and 11C, as installed in a large high occupancy vehicle.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A vehicle relay for reducing an initial start-up current to a fan motor upon activation of a vehicle climate control system comprising:
   a power source;
   at least one input terminal connectable to said power source;
   an output terminal connected to the fan motor;
   a microprocessor electrically connected to the input terminal, said microprocessor programmed with a predetermined time delay upon receipt of current;
   a plurality of transistors electrically connected to an output of the microprocessor;
   a bypass circuit electrically connected to an output of the relay, the bypass circuit including a relay coil and a switch movable from an open position to a closed position in response to activation of the transistors, said output terminal also being connected to an output of said bypass circuit;
   a negative temperature coefficient (NTC) resistor electrically connected between the input terminal and the output terminal;
   said switch of said bypass circuit being open when power is initially applied to said input terminal so that current flows through the NTC resistor to the output terminal and to the motor, said NTC resistor reducing an initial start-up current that is input to the motor upon activation of the climate control system;
   said microprocessor delaying activation of said transistors for said predetermined time delay after which said microprocessor activates the transistors which activates the bypass relay to close the switch;
   upon closure of said switch, said NTC resistor being bypassed to allow maximum operating voltage from said power source to be applied to the motor through said bypass relay.

2. The vehicle relay as set forth in claim 1, further comprising a voltage regulator to provide a constant voltage level to the microprocessor.

3. The vehicle relay as set forth in claim 1, further comprising a first diode between the input terminal and the microprocessor and a second diode between the output terminal and said microprocessor, said diodes enabling said terminals to be interchangeable as to which one is connected to the power source and which one outputs current to the fan motor.

4. The vehicle relay as set forth in claim 3, further comprising a third diode between the transistors and the bypass relay, said third diode clamping inductive energy from said bypass relay when said bypass relay is de-energized.

5. The vehicle relay as set forth in claim 1 as installed within a large high occupancy vehicle.

6. A vehicle relay for protecting a compressor in a vehicle climate control system from an engine RPM in excess of the compressor's rating, said relay comprising:
   a power source;
   at least a first terminal connectable to said power source;
   at least a second terminal connected to a clutch of the compressor in the climate control system;
   a microprocessor electrically connected to the input terminal;
   a plurality of transistors electrically connected to an output of the microprocessor;
   a bypass circuit electrically connected to an output of the transistors, the bypass circuit including an inductor and a switch movable from an open position to a closed position in response to activation of the transistors, said output terminal also being connected to an output of said bypass circuit;
   a third terminal electrically connected to the microprocessor and providing an engine RPM signal to said microprocessor;
   said microprocessor configured to activate the transistors and the bypass relay to close the switch when power is applied to the first terminal, said clutch for said compressor being engaged in response to a clutch signal received from the relay when said bypass circuit is energized and said bypass circuit switch is closed;
   said microprocessor configured to monitor the engine RPM signal received from the third terminal and, in response to said RPM signal indicating engine RPM to be in excess of the rating of the compressor, said microprocessor de-energizing said transistors and said bypass circuit to open the switch and disconnect the clutch signal to disengage the clutch and prevent overspeeding of the compressor.

7. The vehicle relay as set forth in claim 6, wherein after disengaging said clutch, said microprocessor continues to monitor the engine RPM signal received from the third terminal and, in response to said RPM signal indicating engine RPM to be below the rating of the compressor, said microprocessor re-energizing said transistors and said bypass circuit to close the switch and reconnect the clutch signal to re-engage the clutch and activate the compressor.

8. The vehicle relay as set forth in claim 6, further comprising a voltage regulator to provide a constant voltage level to the microprocessor.

9. The vehicle relay as set forth in claim 6, further comprising a first diode between the input terminal and the microprocessor and a second diode between the output terminal and said microprocessor, said diodes enabling said terminals to be interchangeable as to which one is connected to the power source and which one outputs current to the fan motor.

10. The vehicle relay as set forth in claim 9, further comprising a third diode between the transistors and the bypass relay, said third diode clamping inductive energy from said bypass relay when said bypass relay is de-energized.

11. The vehicle relay as set forth in claim 7 as installed within a large high occupancy vehicle.

12. A vehicle relay for protecting a compressor clutch from undervoltage in a vehicle climate control system, said relay comprising:
   a power source;
   at least a first terminal connectable to said power source;
   at least a second terminal connected to a compressor clutch in the vehicle climate control system;
   a microprocessor electrically connected to the input terminal;
   a plurality of transistors electrically connected to an output of the microprocessor;
   a bypass circuit electrically connected to an output of the transistors, the bypass circuit including a relay coil and a switch movable from an open position to a closed position in response to activation of the transistors, said output terminal also being connected to an output of said bypass circuit;
   said microprocessor configured to activate the transistors and the bypass relay to close the switch when power is applied to the first terminal, said clutch for said compressor being engaged in response to a clutch signal received from the relay when said bypass circuit is energized and said bypass circuit switch is closed;
   an electrical connection between input voltage from the first terminal when connected to the power source and said microprocessor, said microprocessor configured to monitor the input voltage received over the electrical connection and, in response to said input voltage being less than sufficient to fully engage the clutch, said microprocessor de-energizing said transistors and said bypass circuit to open the switch and disconnect the clutch signal to disengage the clutch.

13. The vehicle relay as set forth in claim 12, wherein after disengaging said clutch, said microprocessor continues to monitor the input voltage and, in response to said input voltage being sufficient to fully engage the clutch, said microprocessor re-energizing said transistors and said bypass circuit to close the switch and reconnect the clutch signal to re-engage the clutch.

14. The vehicle relay as set forth in claim 12, further comprising a voltage regulator to provide a constant voltage level to the microprocessor.

15. The vehicle relay as set forth in claim 12, further comprising a first diode between the input terminal and the microprocessor and a second diode between the output terminal and said microprocessor, said diodes enabling said terminals to be interchangeable as to which one is connected to the power source and which one outputs current to the clutch.

16. The vehicle relay as set forth in claim 15, further comprising a third diode between the transistors and the bypass relay, said third diode clamping inductive energy from said bypass relay when said bypass relay is de-energized.

17. The vehicle relay as set forth in claim 13 as installed within a large high occupancy vehicle.

18. A vehicle relay for preventing over-cycling of a condenser in a vehicle climate control system comprising:
   a power source;
   at least one input terminal connectable to said power source;
   an output terminal connected to a clutch of the compressor;
   a microprocessor electrically connected to the input terminal, said microprocessor programmed with a predetermined time delay upon receipt of current;
   a plurality of transistors electrically connected to an output of the microprocessor;
   bypass circuit electrically connected to an output of the transistors, the bypass circuit including a relay coil and a switch movable from an open position to a closed position in response to activation of the transistors, said output terminal also being connected to an output of said bypass circuit;

said microprocessor configured to activate the transistors and the bypass relay to close the switch when power is applied to the first terminal, said clutch for said compressor being engaged in response to a clutch signal received from the relay when said bypass circuit is energized and said bypass circuit switch is closed;

said microprocessor, upon receipt of current, delaying activation of said transistors for said predetermined time delay after which said microprocessor activates the transistors and the bypass relay to close the switch and generate the clutch signal; and said clutch for said compressor being engaged in response to said clutch signal to activate the compressor.

19. The vehicle relay as set forth in claim 18, wherein the predetermined time delay is about 20-30 seconds and said vehicle climate control system is installed in a large high occupancy vehicle.

20. A method for reducing an initial start-up current to a fan motor upon activation of a vehicle climate control system using a vehicle relay that includes at least one input terminal connectable to a power source, an output terminal connected to the fan motor, a microprocessor electrically connected to the input terminal and programmed with a predetermined time delay upon receipt of current, a plurality of transistors electrically connected to an output of the microprocessor, a bypass circuit with a switch electrically connected to an output of the transistors, the output terminal also being connected to an output of the bypass circuit, and a negative temperature coefficient (NTC) resistor electrically connected between the input terminal and the output terminal, the switch of the bypass circuit being open when power is initially applied to the input terminal, the method comprising:

applying power to the input terminal with said switch in said bypass circuit being open so that current flows through the NTC resistor to the output terminal and to the motor, said NTC resistor reducing an initial start-up current that is input to the motor upon activation of the climate control system;

delaying, by said microprocessor, activation of said transistors for said predetermined time delay;

after the predetermined time delay, said microprocessor activating the transistors which activates the bypass relay to close the switch;

upon closure of said switch, bypassing said NTC resistor to allow maximum operating voltage from said power source to be applied to the motor through said bypass relay.

* * * * *